United States Patent
Miyachi et al.

(10) Patent No.: US 6,485,088 B1
(45) Date of Patent: Nov. 26, 2002

(54) SHEATHING MATERIAL FOR A CONSTRUCTION MACHINE AND METHOD FOR PRODUCING THE SAME

(75) Inventors: Isao Miyachi, Hiroshima (JP); Shintaro Sakitani, Hiroshima (JP); Kazutaka Yamachi, Hiroshima (JP); Tetsukazu Yashima, Shinminato (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 0 days.

(21) Appl. No.: 09/229,568

(22) Filed: Jan. 13, 1999

(30) Foreign Application Priority Data

Jan. 14, 1998 (JP) .......................................... 10-005978

(51) Int. Cl.⁷ .................. B62D 33/06; B29D 22/00; B29D 9/00; B21D 53/88; G05G 25/00
(52) U.S. Cl. ................. 296/190.08; 296/901; 428/35.7; 428/36.5; 428/412; 428/424.2; 428/424.8; 264/45.7; 29/897; 29/897.2; 74/608; 74/609
(58) Field of Search .............................. 428/36.5, 34.1, 428/35.7, 412, 424.2, 424.8; 180/69.21, 89.17, 89.13, 326, 329, 69.2, 289; 296/207, 901, 191, 190.11, 190.08, 190.01; 74/608, 609; 264/45.7; 29/897, 897.2

(56) References Cited

U.S. PATENT DOCUMENTS 3,712,664 A * 1/1973 May .......................... 296/102
3,761,130 A * 9/1973 Suzuki et al. ................ 297/445
3,966,173 A * 6/1976 Glaesener ................... 256/13.1
4,043,721 A * 8/1977 Lemelson .................... 425/116
4,327,053 A * 4/1982 Cogswell et al. ........... 264/515
4,491,362 A * 1/1985 Kennedy ..................... 296/183
4,546,899 A * 10/1985 Williams ..................... 220/444
4,950,552 A   8/1990 Vogt et al. ...................... 428/73

FOREIGN PATENT DOCUMENTS

| | | |
|---|---|---|
| DE | 198 06 582 A | 8/1998 |
| EP | 0 810 146 A | 12/1997 |
| WO | WO 94/26576 A | 11/1994 |

* cited by examiner

Primary Examiner—Harold Pyon
Assistant Examiner—Michael C. Miggins
(74) Attorney, Agent, or Firm—Oblon, Spivak, McClelland, Maier & Neustadt, P.C.

(57) ABSTRACT

Disclosed is a sheathing material for a construction machine and a method for producing the same, in which lightweighting can be attained without using a reinforcing member, and which is not greatly flexed even if a load is applied. The sheathing material for a construction machine which is lightweighted and has a flexure rigidity is obtained by molding a resined shell $1d$ having a hollow construction by rotational molding, filling a resin foamed body $1e$ such as a hard polyurethane foam within the resined shell $1d$ to set it, thereby providing a sandwiching construction, and adjusting filling density of the resin foamed body $1e$.

18 Claims, 3 Drawing Sheets

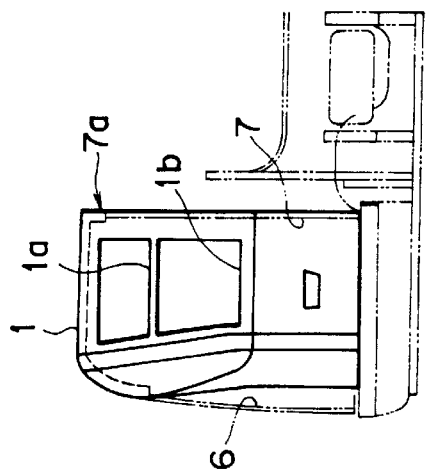
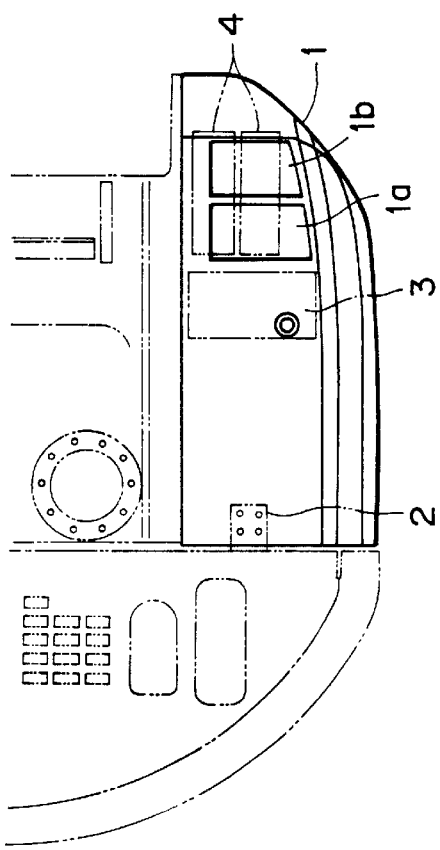
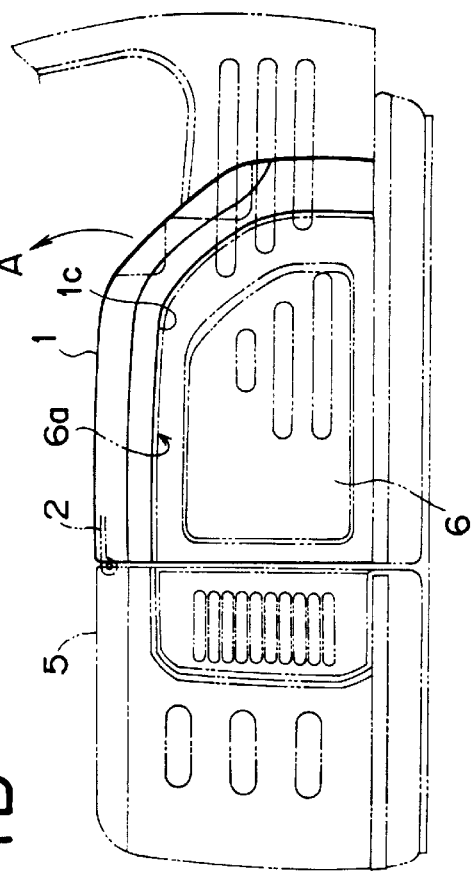

SHEATHING MATERIAL FOR A CONSTRUCTION MACHINE AND METHOD FOR PRODUCING THE SAME

BACKGROUND OF THE INVENTION

1. Field of the Invention

The present invention relates to a sheathing material for a construction machine and a method for producing the same, and more specifically, to a sheathing material for a construction machine and a method for producing the same, which is suitable for a sheathing material for covering an upper rotating body of a hydraulic excavator.

2. Description of the Prior Art

In the past, as shown in FIG. 3, with respect to a guard cover 52 or a bonnet cover 53 forming a sheathing material for an upper rotating body 51 in a hydraulic excavator 50, plastication has been progressed for the purpose of lightweighting. A workman sometimes gets on the cover 52 or 53 when a front attachment is checked. In case of the guard cover 52 which will be explained, therefore, a lifting step 52a is formed on the front surface of the guard cover 52. In order that when the workman gets on the guard cover 52, the step 52a and a top plate 52 are not greatly flexed, a reinforcing number 54 formed from a steel plate, a pipe and the like is mounted on the inner surface of the guard cover 52 to make up for insufficiency of rigidity.

However, since in the conventional guard cover 52, the reinforcing member 54 has to be used, there poses a problem that the number of parts increases to increase costs. Further, since the reinforcing member 54 is formed of metal, the weight of the entire cover guard 55 is not lightweighted so much as compared with the case where the guard cover is made from a steel plate.

The present invention has been accomplished in consideration of the problem as noted with respect to the sheathing material for the conventional hydraulic excavator as described above. The present invention provides a sheathing material for a construction machine and a method for producing the same, in which lightweighting can be attained without using a metallic reinforcing member, and even if a load is applied to a top plate for the sheathing material, it is not greatly flexed.

SUMMARY OF THE INVENTION

The sheathing material for a construction machine according to the present invention comprises a hollow resined shell molded as a sheathing material for an upper rotating body by rotation molding, and a resin foamed body filled in the resined shell.

The sheathing material in the present invention is integrally formed with depressions or projections, the depressions or the projections being provided with flat surfaces whereby a lifting step can be formed.

The shell according to the present invention can be formed of a resin selected from a group comprising a polyethylene resin, a polycarbonate resin, and a nylon resin.

The resin foamed body according to the present invention can be constituted of a hard urethane foam, whose filling density is preferably not less than 30 kg/m$^3$ but not more than 75 kg/m$^3$.

The method for producing a sheathing material for a construction machine according to the present invention principally comprises; molding a hollow resined shell by rotational molding, and using the molded resined shell as a form into which a resin foamed body adjusted in filling density is filled and set.

The rotational molding in the present invention is a molding method in which a thermoplastic resin powder is charged into a hollow mold, after which the mold is heated while being rotated, a shape is made along the surface of the mold, which is then cooled and solidified while being rotated, and after this the molded product is removed. The rotating the mold termed herein means rotating in accordance with a so-called biaxial rotational method in which both axis of ordinates and axis of abscissae are rotated simultaneously.

According to the aforementioned rotational molding, a mold not requiring pressurization need not to have a high strength, and for example, a steel plate, aluminum castings or the like will suffice. Accordingly, a shell for those having a volume such as a sheathing for a construction machine can be fabricated inexpensively. Further, since the interior of the resined shell is hollow, lightweighting can be attained. Particularly, the sheathing material for a construction machine is large in size and complicated in shape, but if the aforementioned rotational molding is utilized, the shell therefor can be obtained easily. Moreover, the molded resined shell can be satisfied with a shock resistance required by the construction machine.

The sheathing material obtained by filling a resin foamed body formed, for example, of a hard polyurethane foam into the resined shell obtained by the rotational molding to set it has a sandwich construction in which both lengthwise sides of the resin foamed body are sandwiched by resin plates, and the resin foam is adjusted in filling density to be not less than 30 kg/m$^3$ but not more than 75 kg/m$^3$ so that the flexure rigidity of the sheathing material can be enhanced to thereby fulfill with both attainment of lightweighting and enhancement of flexure rigidity.

BRIEF DESCRIPTION OF THE DRAWINGS

FIG. 1 is an explanatory view showing a sheathing material according to one embodiment;

DESCRIPTION OF THE PREFERRED EMBODIMENT

Figure 2:
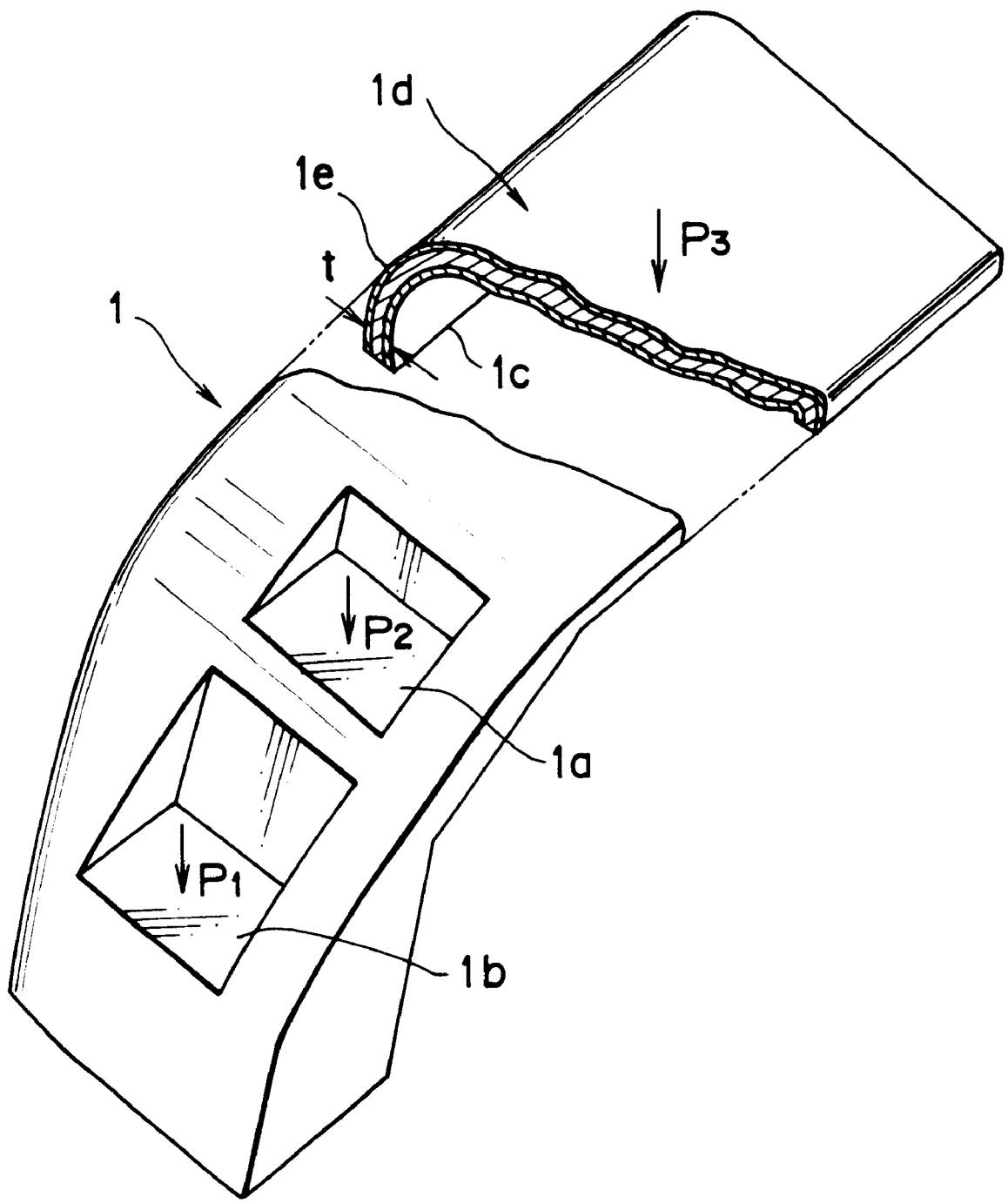
FIG. 2 is a perspective view showing a construction of a guard cover.
Figure 3:
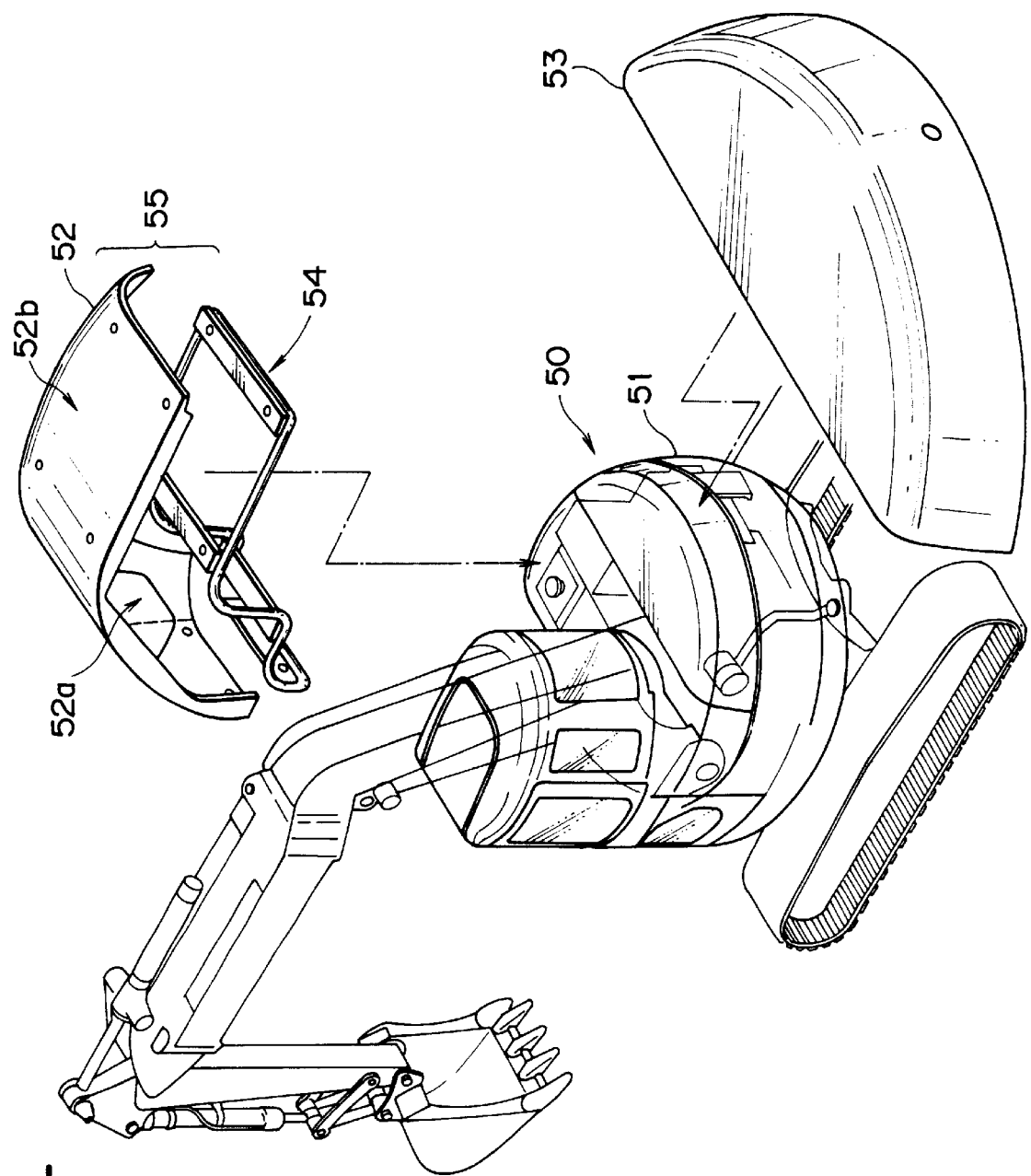
FIG. 3 is a perspective view showing a construction of a conventional guard cover.

These and other objects of the invention will become more apparent upon reading the following description of the preferred embodiment taken together with the drawings attached thereto.

FIG. 1 shows the constitution in which the sheathing material for a construction machine according to the present invention is applied to the hydraulic excavator.

FIG. 1 (a) is a plan view of a guard cover 1 as a sheathing material, FIG. 1 (b) is aside view of the same, and FIG. 1 (c) is a front view of the same. The guard cover 1 can be opened in a direction of arrow A through a hinge 2 so that a fuel tank 3, a battery 4 and the like provided therein can be checked.

Steps 1a and 1b are integrally depressed in the front surface of the guard cover 1 so that the workman can walk up to the top plate of an upper rotating body 5. In the figure, reference numerals 6 and 7 designate side covers made of steel which are stood up substantially parallel with each other from a floor plate not shown.

An opening between both the side covers 6 and 7 is covered by letting a lower edge 1c of the guard cover 1 formed in the inverted U-shape in section lay across an edge 6a from an upper edge to a front edge of the side cover 6 and an edge 7a from an upper edge to a front edge of the side cover 7. A water proof seal made of rubber is mounted on the edges 6a and 7a in contact with the lower edge of the guard cover 1. This water proof seal has not only a water proof function but also a function as a buffer member when the guard cover 1 is closed.

The guard cover 1 has a sandwiching construction comprising a hollow resined shell 1d formed by rotational molding using a polyethylene resin and a hard polyurethane foam 1e as a resin foamed body filled in the resined shell 1d, as shown in FIG. 2. A total plate thickness t of the guard cover 1 is set to 80 mm, in which case a molding thickness is set to 4 mm. According to the rotational molding as described, not only a shell of the guard cover 1 having a voluminous complicated shape can be fabricated easily but also because of a seamless hollow construction, in itself can be used as a form when a hard polyurethane foam described later is filled, and the guard cover 1 can be fabricated easily. Further, stress concentration hardly occurs because of seamless, and it is excellent in terms of strength as compared with the case where for example, two resin plates are arranged in parallel with each other and the resin foamed body is filled therein.

On the other hand, the hard polyurethane foam filled in the resined shell 1d used was Sofran-R manufactured by Toyo Tire and Rubber CO., Ltd. Parameters for determining the flexure rigidity of the guard cover 1 are the bending strength of the resined shell and the Young s modules of the hard polyurethane foam, and the total plate thickness t greatly influences on the flexure rigidity. Four kinds of guard covers 1 whose total plate thickness t is from 50 mm to 80 mm were prepared. The filling density of the hard polyurethane foam was adjusted to five stages from 15 kg/m$^3$ to 100 kg/m$^3$. Parts to which load is applied with respect to the guard cover 1 were specified to two step portions ($P_1$, $P_2$) and one top plate portion ($P_3$), and the maximum displacements at respective parts were obtained. At respective parts $P_1$, $P_2$ and $P_3$, load 1000N corresponding to workman s weight was applied in the range of diameter 125 mm.

TABLE 1

Maximum Displacement Where Load is Applied to Part $P_1$ (mm)

| Filling Density of Foamed | Total Plate Thickness t (mm) | | | |
|---|---|---|---|---|
| (Urethane (kg/m$^3$)) | 50 | 60 | 70 | 80 |
| 15 | 6.16 | 5.63 | 5.16 | 4.76 |
| 30 | 3.99 | 3.48 | 3.08 | 2.78 |
| 60 | 2.29 | 1.96 | 1.73 | 1.55 |
| 75 | 1.90 | 1.63 | 1.44 | 1.29 |
| 100 | 1.51 | 1.29 | 1.14 | 1.03 |

TABLE 2

Maximum Displacement Where Load is Applied to Part $P_2$ (mm)

| Filling Density of Foamed | Total Plate Thickness t (mm) | | | |
|---|---|---|---|---|
| (Urethane (kg/m$^3$)) | 50 | 60 | 70 | 80 |
| 15 | 7.36 | 6.82 | 6.35 | 5.94 |
| 30 | 4.86 | 4.34 | 3.93 | 3.61 |
| 60 | 2.96 | 2.61 | 2.36 | 2.18 |
| 75 | 2.52 | 2.23 | 2.02 | 1.87 |
| 100 | 2.07 | 1.84 | 1.67 | 1.55 |

TABLE 3

Maximum Displacement Where Load is Applied to Part $P_3$ (mm)

| Filling Density of Foamed | Total Plate Thickness t (mm) | | | |
|---|---|---|---|---|
| (Urethane (kg/m$^3$)) | 50 | 60 | 70 | 80 |
| 15 | 10.63 | 9.49 | 8.55 | 7.76 |
| 30 | 7.10 | 6.01 | 5.19 | 4.55 |
| 60 | 4.37 | 3.55 | 2.99 | 2.57 |
| 75 | 3.73 | 3.01 | 2.51 | 2.16 |
| 100 | 3.08 | 2.45 | 2.03 | 1.73 |

It has been confirmed from the test results of Tables 1 to 3 that in the guard cover 1 having the sandwiching construction, as the filling density of the hard polyurethane foam filled in the resined shell 1d increases, the deformation caused by flexure (maximum displacement) reduces. It has been further confirmed that the parts $P_1$ and $P_2$ are higher in rigidity than that of the part $P_3$. This is because of the fact that the steps are formed whereby the sectional coefficient of the resined shell 1d becomes large so that the effect of reinforcement appears.

Further, when the filling density is less than 30 kg/m$^3$, in the part $P_3$, when the total plate thickness is 50 mm, the maximum displacement exceeds 10 mm. Where in this state, a load is repetitively applied, the guard cover 1 becomes possibly deformed. On the other hand, preferably, the higher the filling density, the deformation caused by flexure becomes small. However, it is necessary to increase the quantity of materials used, to lengthen the pouring cycle, and to reinforce the form for maintaining the dimensional accuracy, thus increasing costs.

Accordingly, the filling density of the hard polyurethane foam is preferably not less than 30 kg/m$^3$ but not more than 75 kg/m$^3$, more preferably, 30 to 60 kg/m$^3$, which is the filling density capable of obtaining the sufficient strength and attaining the cost-down. For the guard cover 1, most preferably, the filling density is 30 kg/m$^3$ at which the lightweighting and the cost-down can be attained in the state in which necessary strength is obtained.

While in the above-described embodiment, the resined shell of the present invention has been constituted by rotational molding using the polyethylene resin, it is to be noted that the procedure is not limited thereto but the rotational molding using a polycarbonate resin or a nylon resin can be also employed.

Further, while in the above-described embodiment, the steps of the present invention have been formed in the procedure in which the depressions are formed integral with the guard cover 1, and the flat surfaces are provided in the depressions, it is to be noted that the procedure is not limited thereto but the steps can be also formed in the procedure in which the projections are formed integral with the guard cover 1 and the flat surfaces are provided in the projections.

The sheathing material according to the present invention is not limited to the above-described embodiment, but can be also applied to sheathing materials for a bonnet cover, a roof and the like. Further, this is suitable for the purpose of lightweighting, and can be applied to a suitable sheathing material for a construction machine for which rigidity is demanded.

As will be apparent from the foregoing, according to the sheathing material for a construction machine of the present invention, there is provided a merit that the lightweighting can be attained without using a reinforcing member, and even if a load is applied, it is not greatly flexed.

Further, according to the method for producing a sheathing material for a construction machine of the present invention, there if provided a merit that the shell having a seamless hollow construction is molded by rotational molding, and the shell is used as a form to fill and set the heard polyurethane foam, and therefore, the sheathing material having a voluminous complicated shape can be fabricated easily.

What is claimed is:

1. A construction machine including
   an upper rotating body; and
   a sheathing material attached to the upper rotating body, wherein
      the sheathing material consists of a hollow resin shell and a resin foamed body filling the resin shell and wherein the hollow resin shell is seamless.

2. The construction machine according to claim 1, wherein the resin shell comprises a resin selected from the group consisting of a polyethylene resin, a polycarbonate resin, and a nylon resin.

3. The construction machine according to claim 1, wherein the resin foamed body comprises a polyurethane foam.

4. The construction machine according to claim 3, wherein a filling density of the polyurethane foam is not less than 30 kg/m$^3$ but not more than 75 kg/m$^3$.

5. A method for producing a construction machine, the method comprising
   molding a hollow resin shell by rotational molding;
   filling a resin foamed body in the resin shell; and
   forming the construction machine of claim 1.

6. The construction machine according to claim 1, wherein the construction machine is an excavator.

7. The construction machine according to claim 1, wherein the sheathing material has a thickness of 50 mm or greater.

8. The construction machine according to claim 7, wherein the sheathing material has a thickness of from 50 mm to 80 mm.

9. The construction machine according to claim 1, further comprising a means for moving the upper rotating body relative to the earth.

10. The construction machine according to claim 1, wherein the sheathing material further comprises at least one step.

11. A construction machine including
    an upper rotating body; and
    a sheathing material attached to the upper rotating body, wherein
       the sheathing material consists of a hollow resin shell and a resin foamed body filling the resin shell; and
       the sheathing material forms a part of the construction machine selected from the group consisting of a guard cover, a bonnet cover and a roof and wherein the hollow resin shell is seamless.

12. The construction machine according to claim 11, wherein the resin shell comprises a resin selected from the group consisting of a polyethylene resin, a polycarbonate resin, and a nylon resin.

13. The construction machine according to claim 11, wherein the resin foamed body comprises a polyurethane foam.

14. The construction machine according to claim 13, wherein a filling density of the polyurethane foam is not less than 30 kg/m$^3$ but not more than 75 kg/m$^3$.

15. The construction machine according to claim 11, wherein the construction machine is an excavator.

16. The construction machine according to claim 11, wherein the sheathing material has a thickness of 50 mm or greater.

17. The construction machine according to claim 16, wherein the sheathing material has a thickness of from 50 mm to 80 mm.

18. A method for producing a construction machine, the method comprising
    molding a hollow resin shell by rotational molding;
    filling a resin foamed body in the resin shell; and
    forming the construction machine of claim 11.

\* \* \* \* \*